United States Patent
Zorn

(10) Patent No.: US 9,119,409 B2
(45) Date of Patent: Sep. 1, 2015

(54) WATER SOLUBLE NUTRITIONAL SUPPLEMENT FOR RUMINANTS

(71) Applicant: Philip Zorn, Kansas City, MO (US)

(72) Inventor: Philip Zorn, Kansas City, MO (US)

( * ) Notice: Subject to any disclaimer, the term of this patent is extended or adjusted under 35 U.S.C. 154(b) by 0 days.

(21) Appl. No.: 14/077,449

(22) Filed: Nov. 12, 2013

(65) Prior Publication Data

US 2014/0377402 A1 Dec. 25, 2014

Related U.S. Application Data

(60) Provisional application No. 61/839,209, filed on Jun. 25, 2013.

(51) Int. Cl.
*A23K 1/175* (2006.01)
*A23K 1/18* (2006.01)

(52) U.S. Cl.
CPC ............. *A23K 1/1755* (2013.01); *A23K 1/1813* (2013.01)

(58) Field of Classification Search
CPC ... A01B 12/006; A23K 1/1755; A23K 1/1813
USPC .............................. 426/74, 72, 807, 648, 649
See application file for complete search history.

(56) References Cited

U.S. PATENT DOCUMENTS

| | | | |
|---|---|---|---|
| 3,505,073 A * | 4/1970 | Bode | 426/48 |
| 6,106,874 A | 8/2000 | Liebrecht et al. | |
| 6,572,903 B1 | 6/2003 | Fuhr et al. | |
| 8,277,848 B2 | 10/2012 | Ryu et al. | |
| 2010/0104545 A1* | 4/2010 | Rosales et al. | 424/93.45 |
| 2014/0234474 A1 | 8/2014 | Brunner et al. | |

OTHER PUBLICATIONS

Wikipedia, "Meat and bone meal", Mar. 27, 2015, pp. 1-2, "http://en.wikipedia.org/wiki/Meat_and_bone_meal".*
Feedipedia "Meat and bone meal", Mar. 27, 2015, "http//www.feedipedia.org/node/222".*

* cited by examiner

*Primary Examiner* — Helen F Heggestad
(74) *Attorney, Agent, or Firm* — Hovey Williams LLP

(57) ABSTRACT

A water soluble nutritional supplement for ruminants is provided that comprises a highly soluble calcium component, a phosphorous component, a potassium component, a copper component, a vitamin C component, and a complete vitamin B complex. The nutritional supplement can be produced in a solid form and be readily dissolved in water. The ingestion of the nutritional supplement in liquid form ensures maximal intestinal absorbability of the vitamins and minerals by the ruminant. The contents of the nutritional supplement are optimized in order to enhance overall ruminant health, antler growth, and milk production.

23 Claims, No Drawings

WATER SOLUBLE NUTRITIONAL SUPPLEMENT FOR RUMINANTS

RELATED APPLICATIONS

This application claims the priority benefit under 35 U.S.C. §119(e) of U.S. Provisional Patent Application Ser. No. 61/839,209 entitled "WATER SOLUBLE NUTRITIONAL SUPPLEMENT FOR THE CERVIDAE FAMILY," filed Jun. 25, 2013, the entire disclosure of which is incorporated herein by reference.

BACKGROUND

1. Field of the Invention

The present invention is generally related to nutritional supplements for ruminants. More particularly, the present invention is generally related to nutritional supplements for animals in the Cervidae family.

2. Description of the Related Art

Nutritional supplements for ruminants have been around for many years. A "ruminant" is a mammal that has a four-compartment stomach and includes, for example, animals from the Cervidae family such as white-tailed deer, mule deer, red deer, reindeer, and fallow deer. Recently, vitamins have been added to these nutritional supplements in an attempt to increase the overall health of the ruminants and to increase antler size and muscle mass.

Generally, most commercial ruminant supplements contain calcium and phosphorous. The sources of these minerals are commonly calcium carbonate and calcium phosphate, which are inorganic salts. Both of these inorganic salts are frequently used because they are cheap and contain a high percentage of calcium, which makes them look like great options for ruminant supplements. However, the use of these inorganic salts can cause a number of issues. For example, inorganic calcium salts can contain a high percentage of calcium, which causes them to have a very bitter taste. Consequently, most ruminants would not consume highly-concentrated forms of calcium carbonate due its overly-bitter taste.

In order to address the bitter tastes associated with the various inorganic calcium salts, manufacturers choose to overload their supplements with salts primarily formed from sodium chloride. These salts attract ruminants to the supplement and provide a more suitable taste. Most, if not all, commercial ruminant supplements contain an excessive amount of salt, with some containing a salt content of up to 40 percent by weight. However, this overabundance of salt can lead to many potential health risks in the ruminants including, for example, calcium wasting, hypernatremia, and dehydration. In addition, the increase intake of sodium can decrease the secretion of aldosterone in the ruminants, thereby decreasing the ability of the ruminant to absorb the calcium found in the inorganic calcium salts.

Furthermore, just because the ruminants ingest the various inorganic calcium salts, does not mean that they fully absorb the vital minerals needed to enhance their health. Generally, the inorganic calcium salts can have a very low solubility. For example, calcium carbonate requires a pH of less than 3 in order to be broken down in the body. Consequently, this poses a large problem due to the physiology of the digestive tract in ruminants. The reticulum and rumen in ruminants generally contain a pH of around 6 and, therefore, are unable to fully absorb the necessary calcium in these cases.

Moreover, in contrast to calcium, the more phosphorous a ruminant ingests, the more that is generally absorbed by the body. This is another problem encountered by most, if not all, ruminant supplements in the market. Ideally, calcium and phosphorous should be absorbed in ruminants at a ratio of 2.16:1. While most commercial ruminant supplements contain a calcium to phosphorus ratio that is similar to this, the ratios within these supplements do not reflect the actual ratio absorbed by the ruminant. The use of certain calcium salts can result in decreased calcium absorption and, therefore, can negatively affect the calcium to phosphorous ratio absorbed by the ruminant. Thus, this can lead to more phosphorous being absorbed by the ruminant, which can cause reduced calcitonin levels and, therefore, even lower calcium levels. Additionally, this can also cause parathyroid hormone to be released, which leads to increased bone turnover. Consequently, this puts the ruminant at a greater risk for osteoporosis and other problems, including decreased antler size.

Accordingly, there is a need for a superior nutritional supplement for ruminants that allows for optimal intestinal absorbability of the vitamins and nutrients contained therein.

SUMMARY

In one or more embodiments, the present invention concerns a water soluble nutritional supplement for ruminants. The supplement generally comprises a phosphorous component and a calcium component comprising calcium lactate and calcium gluconate. The supplement also comprises 0 to 20 weight percent of salt and has a calcium to phosphorous ratio greater than 2.1.

In one or more embodiments, the present invention concerns a water soluble nutritional supplement for ruminants. The supplement generally comprises a calcium component having a water solubility of at least 20 g/L and a phosphorous component. The supplement also comprises 0 to 20 weight percent of salt and has a calcium to phosphorous ratio greater than 2.1.

In one or more embodiments, the present invention concerns a liquid nutritional supplement for ruminants. The liquid supplement generally comprises at least 75 weight percent of water, 0.005 to 10 weight percent of calcium lactate dissolved in the water, 0.005 to 10 weight percent of calcium gluconate dissolved in the water, and 0.001 to 1 weight percent of a phosphorous component dissolved in the water. The supplement also has a calcium to phosphorous ratio greater than 2.1.

In one or more embodiments, the present invention concerns a method for providing a nutritional supplement to ruminants. The method comprises (a) providing a solid water soluble nutritional supplement that exhibits a water solubility of at least 20 g/L, wherein the solid supplement comprises a calcium component comprising calcium lactate and calcium gluconate and contains 0 to 20 weight percent of salt; (b) dissolving the solid supplement in water at a rate of not more than 2.0 g/L to thereby provide a liquid nutritional supplement having a turbidity of no more than about 100 NTU as measured according to ISO 7027; and (c) providing the liquid supplement at a location for consumption by one or more ruminants.

DETAILED DESCRIPTION

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

The present invention is directed to a water soluble nutritional supplement that can increase the overall health, antler growth, and/or milk protein production in ruminants. The specific balance of water soluble vitamins and minerals in the nutritional supplements described herein can provide a supplement for ruminants that exhibits high levels of intestinal absorbability and bioavailability. As described further below, the nutritional supplements described herein can comprise a calcium component, a phosphorous component, a potassium component, a copper component, a vitamin C component, and a complete vitamin B complex. Furthermore, the nutritional supplements can be provided in solid form and may be readily dissolvable in water.

More specifically, the nutritional supplements described herein can remedy the deficiencies of conventional ruminant supplements and sufficiently administer calcium into a ruminant's digestive system, thereby allowing a ruminant to absorb an ideal calcium to phosphorus ratio. Furthermore, the nutritional supplements can be used to provide a water source for ruminants that is rich in essential vitamins and nutrients.

Generally, the nutritional supplements are produced in solid form and can then be dissolved into water to form a liquid supplement. As used herein, "solid" refers to the undissolved form of the supplement, while "liquid" refers to the dissolved form of the supplement. The solid supplement can include, for example, powders, granules, pellets, microspheres, and/or extrudates.

The particle size of the solid supplement can greatly affect its water solubility since a smaller particle size can present a greater surface area relative to its overall weight compared to larger particles. Thus, in various embodiments, the solid supplement can have an average particle size of at least 1, 10, 50, or 100 microns and/or not more than 2,000, 1,000, 750, or 500 microns. More particularly, the solid supplement can have an average particle size in the range of about 1 to 2,000, 10 to 1,000, 50 to 750, or 100 to 500 microns.

As described below, the nutritional supplements described herein can contain a number of components that are useful for facilitating and enhancing antler growth and overall health conditions in ruminants.

In various embodiments, the nutritional supplements can comprise a calcium component. Unlike calcium salts used in conventional ruminant supplements, the calcium components used in the supplements described herein can be highly soluble in water. For instance, the calcium component can have a water solubility of at least about 20, 100, or 200 g/L and/or not more than about 1,000, 750, or 500 g/L as measured according to OPPTS 830.7840. More particularly, the calcium component can have a water solubility in the range of about 20 to 1,000, 100 to 750, or 200 to 500 g/L as measured according to OPPTS 830.7840. Furthermore, the calcium component can exhibit the above water solubility rates at a pH in the range of about 2 to 11, 3 to 10, 4 to 9, or 5 to 8. Additionally or alternatively, the calcium component can exhibit the above water solubility rates at a temperature of about 25° C. In certain embodiments, the calcium component can exhibit the above water solubility rates at a temperature of about 25° C. and a pH of about 6.

In one or more embodiments, the calcium component can exhibit an in vitro dissolution rate in water of at least about 50, 60, 75, 85, or 95 and/or not more than about 99.9, 99.5, 99, 98, or 97 percent within at least 20, 30, 40, 50, or 60 minutes as measured using a USP Dissolution Test Apparatus 2, which is described in United States Pharmacopeia (USP) 34/National Formulary (NF) 29 (2011). More particularly, the calcium component can exhibit an in vitro dissolution rate in water in the range of about 50 to 99.9, 60 to 99.5, 75 to 99, 85 to 98, or 95 to 97 percent within at least 20, 30, 40, 50, or 60 minutes as measured using a USP Dissolution Test Apparatus 2. Furthermore, the calcium component can exhibit the above in vitro dissolution rates at a pH in the range of about 2 to 11, 3 to 10, 4 to 9, or 5 to 8. Additionally or alternatively, the calcium component can exhibit the above in vitro dissolution rates at a temperature of about 25° C. In certain embodiments, the calcium component can exhibit the above in vitro dissolution rates at a temperature of about 25° C. and a pH of about 6.

The solid nutritional supplement can comprise at least about 10, 25, 50, or 70 and/or not more than about 99, 95, 90, or 85 weight percent of the calcium component. More particularly, the solid nutritional supplement can comprise in the range of about 10 to 99, 25 to 95, 50 to 90, or 70 to 85 weight percent of the calcium component. The liquid nutritional supplement can comprise at least about 0.001, 0.005, 0.01, or 0.05 and/or not more than about 10, 5, 1, or 0.15 weight percent of the calcium component. More particularly, the liquid nutritional supplement can comprise in the range of about 0.001 to 10, 0.005 to 5, 0.01 to 1, or 0.05 to 0.15 weight percent of the calcium component.

In one or more embodiments, the calcium component can comprise, for example, calcium lactate, calcium gluconate, or a mixture thereof. It has been observed that a mixture of calcium lactate and calcium gluconate can have a greater solubility in water when compared to the individual solubility values for each of these calcium salts. For example, calcium lactate generally has a solubility of about 90 g/L, while calcium gluconate can have a solubility of about 30 g/L. However, when these two calcium salts are combined, the resulting mixture can have a solubility of about 400 g/L.

In one or more embodiments, the solid nutritional supplement can comprise at least about 5, 20, 30, or 40 and/or not more than about 95, 90, 80, or 60 weight percent of calcium lactate. More particularly, the solid nutritional supplement can comprise in the range of about 5 to 95, 20 to 90, 30 to 80, or 40 to 60 weight percent of calcium lactate. Furthermore, the liquid nutritional supplement can comprise at least about 0.0001, 0.0005, 0.001, or 0.01 and/or not more than about 10, 5, 1, or 0.15 weight percent of calcium lactate. More particularly, the liquid nutritional supplement can comprise in the range of about 0.0001 to 10, 0.0005 to 5, 0.001 to 1, or 0.01 to 0.15 weight percent of calcium lactate.

Additionally or alternatively, the solid nutritional supplement can comprise at least about 5, 10, 15, or 20 and/or not more than about 90, 80, 60, or 40 weight percent of calcium gluconate. More particularly, the solid nutritional supplement can comprise in the range of about 5 to 90, 10 to 80, 15 to 60, or 20 to 40 weight percent of calcium gluconate. Furthermore, the liquid nutritional supplement can comprise at least about 0.0001, 0.0005, 0.001, or 0.01 and/or not more than about 10, 5, 1, or 0.15 weight percent of calcium gluconate. More particularly, the liquid nutritional supplement can comprise in the range of about 0.0001 to 10, 0.0005 to 5, 0.001 to 1, or 0.01 to 0.15 weight percent of calcium gluconate.

In one or more embodiments, the nutritional supplements can comprise a weight ratio of calcium gluconate to calcium lactate of at least about 0.1:1, 0.5:1, or 1:1 and/or not more than about 10:1, 5:1, or 2:1. More particularly, the nutritional supplements can comprise a weight ratio of calcium gluconate to calcium lactate in the range of about 0.1:1 to 10:1, 0.5:1 to 5:1, or 1:1 to 2:1.

Furthermore, unlike conventional supplements that utilize calcium carbonate, the nutritional supplements described herein can add little to no taste to the water when dissolved therein. Since the nutritional supplements described herein can utilize different types of calcium salts, they will not deter a ruminant from drinking water fortified with the supplement based on a bad or bitter taste. In one or embodiments, the liquid nutritional supplement can comprise a weight ratio of water to calcium component of at least 10:1, 100:1, or 1,000:1 and/or not more than about 10,000:1, 5,000:1, or 3,000:1. More particularly, the liquid nutritional supplement can comprise a weight ratio of water to the calcium component in the range of about 10:1 to 10,000:1, 100:1 to 5,000:1, 1,000:1 to 3,000:1.

In various embodiments, the nutritional supplements also comprise a phosphorous component. Like the calcium components, the phosphorous components used in the supplements can be highly soluble in water. For example, the phosphorous component can exhibit a water solubility of at least about 20, 100, or 200 g/L and/or not more than about 1,000, 500, or 300 g/L as measured according to OPPTS 830.7840. More particularly, the phosphorous component can have a water solubility in the range of about 20 to 1,000, 100 to 500, or 200 to 300 g/L as measured according to OPPTS 830.7840.

In one or more embodiments, the solid nutritional supplement comprises at least about 0.5, 1, 2, or 3 and/or not more than about 50, 30, 15, or 6 weight percent of the phosphorous component. More particularly, the solid nutritional supplement can comprise in the range of about 0.5 to 50, 1 to 30, 2 to 15, or 3 to 6 weight percent of the phosphorous component. Furthermore, the liquid nutritional supplement can comprise at least about 0.00001, 0.00005, 0.0001, or 0.001 and/or not more than about 5, 1, 0.1, or 0.01 weight percent of the phosphorous component. More particularly, the liquid nutritional supplement can comprise in the range of about 0.00001 to 5, 0.00005 to 1, 0.0001 to 0.1, or 0.001 to 0.01 weight percent of the phosphorous component. Additionally or alternatively, the liquid nutritional supplement can comprise a weight ratio of water to phosphorous component of at least 10:1, 100:1, or 1,000:1 and/or not more than about 10,000:1, 5,000:1, or 3,000:1. More particularly, the liquid supplement can comprise a weight ratio of water to phosphorous component in the range of about 10:1 to 10,000:1, 100:1 to 5,000:1, or 1,000:1 to 3,000:1.

In one or more embodiments, the phosphorous component can comprise a monopotassium phosphate. Generally, monopotassium phosphate can have a water solubility of about 220 g/L.

As previously noted, the calcium to phosphorous ratio in the supplement can ideally reflect the calcium to phosphorous ratio required by ruminants. In certain embodiments, the supplements can have a calcium to phosphorous ratio of about 2.16:1. It would be appreciated that calcium to phosphorous ratios around this value can provide ruminants with the ideal mineral ratio for facilitating antler growth, as calcium and phosphorous are essential for promoting antler development. Thus, in various embodiments, the nutritional supplements can comprise a calcium to phosphorous weight ratio of at least about 2:1, 2.13:1, or 2.16:1 and/or not more than about 10:1, 5:1, or 2.5:1. More particularly, the nutritional supplements can comprise a calcium to phosphorous weight ratio in the range of about 2:1 to 10:1, 2.13:1 to 5:1, or 2.16:1 to 2.5:1.

In various embodiments, the nutritional supplements also comprise a potassium component. The potassium component can be included in the supplement in order to help neutralize the increased sodium intake of the ruminants from other mineral supplements. In particular, the intake of the potassium component can activate the sodium/potassium pump in the kidneys of the ruminants, thus causing the cells to expel sodium and take in potassium. Furthermore, when potassium levels are increased, more aldosterone can be secreted, which leads to increased calcium absorption by the ruminant.

In one or more embodiments, the solid nutritional supplement can comprise at least about 0.5, 1, 2, or 4 and/or not more than about 50, 20, 10, or 7 weight percent of the potassium component. More particularly, the solid nutritional supplement can comprise in the range of about 0.5 to 50, 1 to 20, 2 to 10, or 4 to 7 weight percent of the potassium component. Furthermore, the liquid nutritional supplement can comprise at least about 0.00001, 0.00005, 0.0001, or 0.001 and/or not more than about 5, 1, 0.1, or 0.01 weight percent of the potassium component. More particularly, the liquid nutritional supplement can comprise in the range of about 0.0001 to 5, 0.00005 to 1, 0.0001 to 0.1, or 0.001 to 0.01 weight percent of the potassium component. Additionally or alternatively, the liquid nutritional supplement can comprise a weight ratio of water to potassium component of at least about 10:1, 100:1, or 1,000:1 and/or not more than about 10,000:1, 5,000:1, or 3,000:1. More particularly, the liquid nutritional supplement can comprise a weight ratio of water to potassium component in the range of about 10;1 to 10,000:1, 100:1 to 5,000:1, or 1,000:1 to 3,000:1.

In one or more embodiments, the potassium component comprises a monopotassium phosphate. As noted above, monopotassium phosphate can also function as the phosphorous component in the supplements. Thus, the overall amount of the phosphorous component and potassium component should be considered in embodiments where monopotassium phosphate is utilized in the supplement.

In various embodiments, the nutritional supplements also comprise a copper component. Copper can be a crucial mineral for proper cell function. Angiogenesis is the process in which blood vessels are created from pre-existing vessels and copper is necessary for angiogenesis to occur. During antler growth, angiogenesis is occurring at a rapid rate and is a key contributor to velvet growth. The velvet supplies the nourishment for the growing antlers in ruminants. In one or more embodiments, the copper component comprises copper gluconate.

In one or more embodiments, the solid nutritional supplement comprises at least about 0.01, 0.1, or 1 and/or not more than about 20, 10, or 5 weight percent of the copper component. More particularly, the solid nutritional supplement can comprise in the range of about 0.01 to 20, 0.1 to 10, or 1 to 5 weight percent of the copper component. Furthermore, the liquid nutritional supplement can comprise at least about 0.00001, 0.00005, or 0.0001, and/or not more than about 0.1, 0.01, or 0.001 weight percent of the copper component. More particularly, the liquid nutritional supplement can comprise in the range of about 0.00001 to 0.1, 0.00005 to 0.01, or 0.001 to 0.0001 weight percent of the copper component. Additionally or alternatively, the liquid nutritional supplement can comprise a weight ratio of water to copper component of at least 10:1, 100:1, or 1,000:1 and/or not more than about 50,000:1, 25,000:1, or 10,000:1. More particularly, the liquid nutritional supplement can comprise a weight ratio of water to copper component in the range of about 10:1 to 50,000:1, 100:1 to 25,000:1, or 1,000:1 to 10,000:1.

In various embodiments, the nutritional supplements can also comprise a vitamin C component. Vitamin C can be critical for the synthesis of collagen. Incomplete development of collagen can lead to restricted blood vessel growth. During rapid angiogenesis in antler growth, collagen is continuously laid down to support new blood vessel growth. A deficiency in vitamin C can inhibit angiogenesis and, therefore, limit antler growth. Ruminants that do not have a regular source of vitamin C may expose this deficiency visibly with antler defects. In one or more embodiments, the vitamin C component comprises ascorbic acid.

In one or more embodiments, the solid nutritional supplement comprises at least about 0.5, 1, or 2 and/or not more than about 10, 5, or 3 weight percent of the vitamin C component. More particularly, the solid nutritional supplement can comprise in the range of about 0.5 to 10, 1 to 5, or 2 to 3 weight percent of the vitamin C component. Furthermore, the liquid nutritional supplement can comprise at least about 0.00001, 0.00005, 0.0001, or 0.001 and/or not more than about 0.1, 0.01, or 0.005 weight percent of the vitamin C component. More particularly, the liquid nutritional supplement can comprise in the range of about 0.00001 to 0.1, 0.00005 to 0.01, or 0.001 to 0.005 weight percent of the vitamin C component. Additionally or alternatively, the liquid nutritional supplement can comprise a weight ratio of water to vitamin C component of at least 10:1, 100:1, or 1,000:1 and/or not more than about 50,000:1, 25,000:1, or 10,000:1. More particularly, the liquid nutritional supplement can comprise a weight ratio of water to vitamin C component in the range of about 10:1 to 50,000:1, 100:1 to 25,000:1, or 1,000:1 to 10,000:1.

In various embodiments, the nutritional supplements also comprise a complete vitamin B complex. Similar to vitamin C, the vitamin B complex can be necessary for proper bodily function in ruminants. The complete vitamin B complex generally comprises thiamine, riboflavin, niacin, pantothenic acid, pyridoxine hydrochloride, biotin, folic acid, and cyanocobalamin.

Thiamine, i.e., vitamin B1, is important for nerve function and the production of energy from carbohydrates. In one or more embodiment, the thiamine can comprise thiamine mononitrate.

In one or more embodiments, the solid nutritional supplement comprises at least about 0.0001, 0.001, or 0.01 and/or not more than about 5, 1, or 0.1 weight percent of thiamine. More particularly, the solid nutritional supplement can comprise in the range of about 0.0001 to 5, 0.001 to 1, or 0.01 to 0.1 weight percent of thiamine. Furthermore, the liquid nutritional supplement can comprise at least about 0.000001, 0.000005, or 0.00001 and/or not more than about 0.1, 0.01, or 0.001 weight percent of thiamine. More particularly, the liquid nutritional supplement can comprise in the range of about 0.00001 to 0.1, 0.000005 to 0.01, or 0.00001 to 0.001 weight percent of thiamine. Additionally or alternatively, the liquid nutritional supplement can comprise a weight ratio of water to thiamine of at least 100:1, 1,000:1, or 10,000:1 and/or not more than about 1,000,000:1, 500,000:1, or 100,000:1. More particularly, the liquid nutritional supplement can comprise a weight ratio of water to thiamine in the range of about 100:1 to 1,000,000:1, 1,000:1 to 500,000:1, or 10,000:1 to 100,000:1.

Riboflavin, i.e., vitamin B2, is involved in catabolism of fatty acids and energy production. In one or more embodiments, the solid nutritional supplement comprises at least about 0.0001, 0.001, or 0.01 and/or not more than about 5, 1, or 0.1 weight percent of riboflavin. More particularly, the solid nutritional supplement can comprise in the range of about 0.0001 to 5, 0.001 to 1, or 0.01 to 0.1 weight percent of riboflavin. Furthermore, the liquid nutritional supplement can comprise at least about 0.000001, 0.000005, or 0.00001 and/or not more than about 0.1, 0.01, or 0.001 weight percent of riboflavin. More particularly, the liquid nutritional supplement can comprise in the range of about 0.00001 to 0.1, 0.000005 to 0.01, or 0.00001 to 0.001 weight percent of riboflavin. Additionally or alternatively, the liquid nutritional supplement can comprise a weight ratio of water to riboflavin of at least 100:1, 1,000:1, or 10,000:1 and/or not more than about 1,000,000:1, 500,000:1, or 100,000:1. More particularly, the liquid nutritional supplement can comprise a weight ratio of water to riboflavin in the range of about 100:1 to 1,000,000:1, 1,000:1 to 500,000:1, or 10,000:1 to 100,000:1.

Niacin, i.e., vitamin B3, is crucial for metabolism of glucose and fat. In one or more embodiments, the solid nutritional supplement comprises at least about 0.001, 0.01, or 0.1 and/or not more than about 5, 1, or 0.5 weight percent of niacin. More particularly, the solid nutritional supplement can comprise in the range of about 0.001 to 5, 0.01 to 1, or 0.1 to 0.5 weight percent of niacin. Furthermore, the liquid nutritional supplement can comprise at least about 0.000001, 0.000005, or 0.00001 and/or not more than about 0.1, 0.01, or 0.001 weight percent of niacin. More particularly, the liquid nutritional supplement can comprise in the range of about 0.00001 to 0.1, 0.000005 to 0.01, or 0.00001 to 0.001 weight percent of niacin. Additionally or alternatively, the liquid nutritional supplement can comprise a weight ratio of water to niacin of at least 100:1, 1,000:1, or 10,000:1 and/or not more than about 1,000,000:1, 500,000:1, or 100,000:1. More particularly, the liquid nutritional supplement can comprise a weight ratio of water to niacin in the range of about 100:1 to 1,000,000:1, 1,000:1 to 500,000:1, or 10,000:1 to 100,000:1.

Pantothenic acid, i.e., vitamin B5, is a precursor to coenzyme A, which is involved in the synthesis of amino acids, neurotransmitters, cholesterol, and antibodies. In one or more embodiments, pantothenic acid comprises calcium pantothenate.

In one or more embodiments, the solid nutritional supplement comprises at least about 0.001, 0.01, or 0.1 and/or not more than about 5, 1, or 0.5 weight percent of pantothenic acid. More particularly, the solid nutritional supplement can comprise in the range of about 0.001 to 5, 0.01 to 1, or 0.1 to 0.5 weight percent of pantothenic acid. Furthermore, the liquid nutritional supplement can comprise at least about 0.000001, 0.000005, or 0.00001 and/or not more than about 0.1, 0.01, or 0.001 weight percent of pantothenic acid. More particularly, the liquid nutritional supplement can comprise in the range of about 0.00001 to 0.1, 0.000005 to 0.01, or 0.00001 to 0.001 weight percent of pantothenic acid. Additionally or alternatively, the liquid nutritional supplement can comprise a weight ratio of water to pantothenic acid of at least 100:1, 1,000:1, or 10,000:1 and/or not more than about 1,000,000:1, 500,000:1, or 100,000:1. More particularly, the liquid nutritional supplement can comprise a weight ratio of water to pantothenic acid in the range of about 100:1 to 1,000,000:1, 1,000:1 to 500,000:1, or 10,000:1 to 100,000:1.

Pyridoxine, i.e., vitamin B6, plays a role in hemoglobin synthesis and helps produce nicotinic acid. In one or more embodiments, the pyridoxine comprises pyridoxal-5-phosphate.

In one or more embodiments, the solid nutritional supplement comprises at least about 0.0001, 0.001, or 0.01 and/or not more than about 5, 1, or 0.1 weight percent of pyridoxine. More particularly, the solid nutritional supplement can comprise in the range of about 0.0001 to 5, 0.001 to 1, or 0.01 to 0.1 weight percent of pyridoxine. Furthermore, the liquid nutritional supplement can comprise at least about 0.000001, 0.000005, or 0.00001 and/or not more than about 0.1, 0.01, or 0.001 weight percent of pyridoxine. More particularly, the liquid nutritional supplement can comprise in the range of about 0.00001 to 0.1, 0.000005 to 0.01, or 0.00001 to 0.001 weight percent of pyridoxine. Additionally or alternatively, the liquid nutritional supplement can comprise a weight ratio of water to pyridoxine of at least 100:1, 1,000:1, or 10,000:1 and/or not more than about 1,000,000:1, 500,000:1, or 100,000:1. More particularly, the liquid nutritional supplement can comprise a weight ratio of water to pyridoxine in the range of about 100:1 to 1,000,000:1, 1,000:1 to 500,000:1, or 10,000:1 to 100,000:1.

Biotin, i.e., vitamin B7, is a co-enzyme and helps in the metabolism of proteins, lipids, and carbohydrates. In one or more embodiments, the solid nutritional supplement comprises at least about 0.0001, 0.001, or 0.01 and/or not more than about 5, 1, or 0.1 weight percent of biotin. More particularly, the solid nutritional supplement can comprise in the range of about 0.0001 to 5, 0.001 to 1, or 0.01 to 0.1 weight percent of biotin. Furthermore, the liquid nutritional supplement can comprise at least about 0.000001, 0.000005, or 0.00001 and/or not more than about 0.1, 0.01, or 0.001 weight percent of biotin. More particularly, the liquid nutritional supplement can comprise in the range of about 0.00001 to 0.1, 0.000005 to 0.01, or 0.00001 to 0.001 weight percent of biotin. Additionally or alternatively, the liquid nutritional supplement can comprise a weight ratio of water to biotin of at least 100:1, 1,000:1, or 10,000:1 and/or not more than about 1,000,000:1, 500,000:1, or 100,000:1. More particularly, the liquid nutritional supplement can comprise a weight ratio of water to biotin in the range of about 100:1 to 1,000,000:1, 1,000:1 to 500,000:1, or 10,000:1 to 100,000:1.

Folic acid, i.e., vitamin B9, is crucial for cell division and erythropoiesis. Also, folic acid supplements have led to increased milk production in ruminants. In one or more embodiments, the solid nutritional supplement comprises at least about 0.01, 0.1, or 0.5 and/or not more than about 10, 5, or 2 weight percent of folic acid. More particularly, the solid nutritional supplement can comprise in the range of about 0.01 to 10, 0.1 to 5, or 0.5 to 2 weight percent of folic acid. Furthermore, the liquid nutritional supplement can comprise at least about 0.000001, 0.000005, or 0.00001 and/or not more than about 0.1, 0.01, or 0.001 weight percent of folic acid. More particularly, the liquid nutritional supplement can comprise in the range of about 0.00001 to 0.1, 0.000005 to 0.01, or 0.00001 to 0.001 weight percent of folic acid. Additionally or alternatively, the liquid nutritional supplement can comprise a weight ratio of water to folic acid of at least 100:1, 1,000:1, or 10,000:1 and/or not more than about 1,000,000:1, 500,000:1, or 100,000:1. More particularly, the liquid nutritional supplement can comprise a weight ratio of water to folic acid in the range of about 100:1 to 1,000,000:1, 1,000:1 to 500,000:1, or 10,000:1 to 100,000:1.

Cyanocobalamin, i.e., vitamin B12, can be necessary for the creation of blood cells in bone marrow. Furthermore, cyanocobalamin can be low during early lactation. Supplementation of cyanocobalamin has led to increased milk protein production in ruminants. In one or more embodiments, the solid nutritional supplement comprises at least about 0.0001, 0.001, or 0.01 and/or not more than about 5, 1, or 0.1 weight percent of cyanocobalamin. More particularly, the solid nutritional supplement can comprise in the range of about 0.0001 to 5, 0.001 to 1, or 0.01 to 0.1 weight percent of cyanocobalamin. Furthermore, the liquid nutritional supplement can comprise at least about 0.000001, 0.000005, or 0.00001 and/or not more than about 0.1, 0.01, or 0.001 weight percent of cyanocobalamin. More particularly, the liquid nutritional supplement can comprise in the range of about 0.00001 to 0.1, 0.000005 to 0.01, or 0.00001 to 0.001 weight percent of cyanocobalamin. Additionally or alternatively, the liquid nutritional supplement can comprise a weight ratio of water to cyanocobalamin of at least 100:1, 1,000:1, or 10,000:1 and/or not more than about 1,000,000:1, 500,000:1, or 100,000:1. More particularly, the liquid nutritional supplement can comprise a weight ratio of water to cyanocobalamin in the range of about 100:1 to 1,000,000:1, 1,000:1 to 500,000:1, or 10,000:1 to 100,000:1.

Furthermore, unlike conventional supplements, salts are not the attractant in the nutritional supplements described herein. In contrast, the attractant is water, which every ruminant needs. As used herein, "salt" refers to any solid salt commonly added to ruminant supplements to enhance their taste. In various embodiments, this salt comprises sodium chloride. For example, the salt can comprise at least about 50, 75, or 90 weight percent of sodium chloride. Generally, substantially all or all of the salt comprises sodium chloride. As used herein, "substantially all" means that at least 99.9 weight percent of the salt is formed from sodium chloride.

In various embodiments, the solid nutritional supplement can comprise less than about 40, 20, 10, 5, or 1 weight percent of salt. In certain embodiments, the solid nutritional supplement can contain no added salt. Likewise, the liquid nutritional supplement can comprise less than about 1, 0.01, 0.001, or 0.0001 weight percent of salt. Furthermore, in certain embodiments, the liquid supplement can contain no added salt.

Moreover, unlike conventional supplements, the nutritional supplements described herein can contain little to no amount of added protein. For example, the solid nutritional supplement can comprise less than about 20, 10, 5, or 1 weight percent of protein. In certain embodiments, the nutritional supplements contain no added protein.

The nutritional supplements can also contain other various additives as long as these additives do not negatively impact the solubility of the supplement. For instance, the nutritional supplements can comprise at least one veterinary medicine such as, for example, a dewormer. Additionally or alternatively, the nutritional supplements can comprise an artificial flavoring and/or a natural flavoring that is preferred by ruminants.

It should be noted that the above weight percentages have been calculated to take into account the average body weight of ruminants and their average water intake. Some ruminants, such as white-tailed deer, drink one to two liters of water per day on average when there is an available water source and approximately three liters per day during peak times of the year.

In one or more embodiments, in order to ensure a neutral taste, not more than about 10, 5, 3, or 2 grams of the solid nutritional supplement can be added per liter of water. Thus, in various embodiments, the liquid nutritional supplement can comprise at least about 75, 90, 99, or 99.5 weight percent of water.

In certain embodiments, the nutritional supplement comprises a high bioavailability that is independent of pH. As used herein, "bioavailability" is a measurement of the rate at which a particular component reaches the systemic circulation. The bioavailability of the nutritional supplement can be predicted by measuring the in vitro dissolution rate of the component using a USP Dissolution Test Apparatus 2.

In one or more embodiments, the solid nutritional supplement can exhibit an in vitro dissolution rate in water of at least about 50, 60, 75, 85, or 95 and/or not more than about 99.9, 99.5, 99, 98, or 97 percent within at least 20, 30, 40, 50, or 60 minutes as measured using a USP Dissolution Test Apparatus 2. More particularly, the solid nutritional supplement can exhibit an in vitro dissolution rate in water in the range of about 50 to 99.9, 60 to 99.5, 75 to 99, 85 to 98, or 95 to 97 percent within at least 20, 30, 40, 50, or 60 minutes as measured using a USP Dissolution Test Apparatus 2. Furthermore, the solid nutritional supplement can exhibit the above in vitro dissolution rates at a pH in the range of about 2 to 11, 3 to 10, 4 to 9, or 5 to 8. Additionally or alternatively, the solid nutritional supplement can exhibit the above in vitro dissolution rates at a temperature of about 25° C. In certain embodiments, the solid nutritional supplement can exhibit the above in vitro dissolution rates at a temperature of about 25° C. and a pH of about 6.

The high bioavailability of the nutritional supplements described herein is in contrast to calcium salts commonly used in conventional supplements for ruminants. For example, the bioavailability of calcium carbonate can be heavily dependent on the pH of the environment. More specifically, calcium carbonate can have a bioavailability of around 75% at a pH of 1.5; however, calcium carbonate generally only has a bioavailability of less than 1% at a pH greater than 4.

Unlike conventional ruminant supplements, the solid nutritional supplements described herein can rapidly dissolve in water. For instance, the solid nutritional supplement can have a water solubility of at least about 20, 50, or 70 g/L and/or not more than about 1,000, 750, or 500 g/L as measured according to OPPTS 830.7840. More particularly, the solid nutritional supplement can have a water solubility in the range of about 20 to 1,000, 50 to 750, or 70 to 500 g/L as measured according to OPPTS 830.7840. Furthermore, the solid nutritional supplement can exhibit the above water solubility rates at a pH in the range of about 2 to 11, 3 to 10, 4 to 9, or 5 to 8. Additionally or alternatively, the solid nutritional supplement can exhibit the above water solubility rates at a temperature of about 25° C. In certain embodiments, the solid nutritional supplement can exhibit the above water solubility rates at a temperature of about 25° C. and a pH of about 6.

Furthermore, water turbidity of the fortified water can be crucial since certain ruminants will not drink water that is too turbid. Thus, the amount of the nutritional supplement added to a water source can be controlled to avoid turbid conditions in the water. For example, when two grams or less of the solid nutritional supplement are added per liter of water, the liquid nutritional supplement can have a turbidity of less than 100, 50, or 25 NTU as measured according to ISO 7027. Additionally or alternatively, the liquid nutritional supplement can have a secchi disk depth of at least 4, 6, 8, 10, 12, 14, or 16 and/or not more than about 50, 45, 40, 35, 30, 25, or 20 feet.

In one or more embodiments, the present invention concerns a method for providing a nutritional supplement to ruminants. The method comprises (a) dissolving the solid supplement in water to thereby provide a liquid nutritional ruminant supplement; and (b) providing the liquid supplement at a location for consumption by one or more ruminants. Such locations can include, for example, a water source commonly used by ruminants. Generally, steps (a) and (b) can occur in the same location or can occur in different locations. Various water sources can include, for example, water tanks, water troughs, and other water containment devices known in the art.

The solid supplement can be dissolved in the water at a rate of at least about 0.1, 1, or 1.5 and/or not more than about 100, 10, or 2 grams of supplement per liter of water. More particularly, the solid supplement can be dissolved in the water at a rate in the range of about 0.1 to 100, 1 to 10, or 1.5 to 2 grams of supplement per liter of water. Furthermore, the water that the solid supplement can be dissolved in can have a pH of at least about 4, 5, or 6 and/or not more than about 12, 10, or 8. More particularly, the water can have a pH in the range of about 4 to 12, 5 to 10, or 6 to 8.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventor hereby states their intent to rely on the Doctrine of Equivalents to determine and assess the reasonably fair scope of the present invention as it pertains to any apparatus not materially departing from but outside the literal scope of the invention as set forth in the following claims.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

A nutritional supplement in the form of a powder was produced by combining all of components listed in TABLE 1 below and mixing them thoroughly until properly intermixed. After mixing the components together, 149 grams of the produced powder was mixed and dissolved in 25 gallons of water.

TABLE 1

| Component | Source | Amount (g) |
| --- | --- | --- |
| Calcium Lactate | AIE Pharmaceuticals Inc. | 185 |
| Calcium Gluconate | AIE Pharmaceuticals Inc. | 255.6 |
| Ascorbic Acid | AIE Pharmaceuticals Inc. | 15.2 |
| Monopotassium Phosphate | AIE Pharmaceuticals Inc. | 29 |
| Copper Gluconate | Pure Bulk, Inc. | 15.2 |
| Thiamine Mononitrate | Pure Bulk, Inc. | 0.19 |
| Riboflavin | Pure Bulk, Inc. | 0.304 |
| Niacin | Pure Bulk, Inc. | 1.9 |
| Pantothenic Acid/Calcium Pantothenate | Pure Bulk, Inc. | 0.76 |
| Pyridoxal-5-Phosphate | Pure Bulk, Inc. | 0.38 |
| Biotin 1% | Pure Bulk, Inc. | 0.38 |
| Folic Acid 1% | Pure Bulk, Inc. | 5.7 |
| Cyanocobalmin 1% | Pure Bulk, Inc. | 0.076 |
| Total Weight of Composition | | 509.69 |

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the term "about" means that the associated value can vary by 10 percent from the recited value.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. A water soluble nutritional supplement for ruminants, said supplement comprising:
    a calcium component comprising calcium lactate and calcium gluconate;
    a phosphorous component; and
    0 to 20 weight percent of sodium chloride,
    wherein said supplement has a calcium to phosphorous ratio greater than 2.1:1,
    wherein said supplement has a weight ratio of calcium gluconate to calcium lactate in the range of 0.1:1 to 10:1,
    wherein said supplement comprises less than 10 weight percent of protein.

2. The water soluble nutritional supplement of claim 1, wherein said supplement comprises 5 to 80 weight percent of said calcium lactate and 5 to 80 weight percent of said calcium gluconate.

3. The water soluble nutritional supplement of claim 1, wherein said supplement comprises 0.5 to 50 weight percent of said phosphorous component.

4. The water soluble nutritional supplement of claim 1, wherein said calcium to phosphorous ratio is in the range of 2.13:1 to 10:1.

5. The water soluble nutritional supplement of claim 1, wherein said supplement is in the form of a solid.

6. The water soluble nutritional supplement of claim 5, wherein said supplement comprises:
    a potassium component;
    a copper component;
    a vitamin C component; and
    a complete vitamin B complex comprising thiamine, riboflavin, niacin, pantothenic acid, pyridoxine hydrochloride, biotin, folic acid, and cyanocobalamin.

7. The water soluble nutritional supplement of claim 1, wherein said supplement exhibits a water solubility at 25° C. in the range of 50 to 1,000 g/L, as measured according to OPPTS 830.7840.

8. The water soluble nutritional supplement of claim 1, wherein said supplement exhibits an in vitro dissolution rate at 25° C. and a pH of 6 of at least 50 percent within 60 minutes, as measured using a USP Dissolution Test Apparatus 2.

9. A water soluble nutritional supplement for ruminants, said supplement comprising:
    a calcium component having a water solubility at 25° C. of at least 20 g/L as measured according to OPPTS 830.7840, wherein said calcium component comprises a weight ratio of calcium gluconate to calcium lactate in the range of 0.1:1 to 10:1;
    a phosphorous component; and
    0 to 20 weight percent of sodium chloride,
    wherein said supplement has a calcium to phosphorous ratio greater than 2.1:1,
    wherein said supplement comprises less than 10 weight percent of protein.

10. The water soluble nutritional supplement of claim 9, wherein said calcium component has a water solubility at 25° C. in the range of 20 to 500 g/L, as measured according to OPPTS 830.7840.

11. The water soluble nutritional supplement of claim 9, wherein said phosphorous component has a water solubility at 25° C. in the range of 20 to 500 g/L, as measured according to OPPTS 830.7840.

12. The water soluble nutritional supplement of claim 9, wherein said supplement is in the form of a solid.

13. The water soluble nutritional supplement of claim 12, wherein said supplement comprises:
    a potassium component;
    a copper component;
    a vitamin C component; and
    a complete vitamin B complex comprising thiamine, riboflavin, niacin, pantothenic acid, pyridoxine hydrochloride, biotin, folic acid, and cyanocobalamin.

14. The water soluble nutritional supplement of claim 9, wherein said supplement exhibits a water solubility at 25° C. in the range of 50 to 1,000 g/L, as measured according to OPPTS 830.7840.

15. The water soluble nutritional supplement of claim 9, wherein said supplement exhibits an in vitro dissolution rate at 25° C. and a pH of 6 of at least 50 percent within 60 minutes, as measured using a USP Dissolution Test Apparatus 2.

16. A liquid nutritional supplement for ruminants, said supplement comprising:
    at least 75 weight percent of water;
    0.0001 to 10 weight percent of calcium lactate dissolved in said water;
    0.0001 to 10 weight percent of calcium gluconate dissolved in said water; and
    0.0001 to 1 weight percent of a phosphorous component dissolved in said water,
    wherein said supplement has a calcium to phosphorous ratio greater than 2.1:1,
    wherein said supplement has a weight ratio of calcium gluconate to calcium lactate in the range of 0.1:1 to 10:1,
    wherein said supplement comprises less than 2 weight percent of protein.

17. The liquid nutritional supplement of claim 16, wherein said supplement has a weight ratio of calcium gluconate to calcium lactate in the range of 0.5:1 to 10:1.

18. The liquid nutritional supplement of claim 16, wherein said calcium to phosphorous ratio is in the range of 2.13:1 to 10:1.

19. The liquid nutritional supplement of claim 16, wherein said supplement comprises:
    a potassium component;
    a copper component;
    a vitamin C component; and
    a complete vitamin B complex comprising thiamine, riboflavin, niacin, pantothenic acid, pyridoxine hydrochloride, biotin, folic acid, and cyanocobalamin.

20. The liquid nutritional supplement of claim 16, wherein said supplement has a secchi disk depth of at least 8 feet.

21. A method for providing a nutritional supplement to ruminants, said method comprising:
(a) providing a solid water soluble nutritional supplement for ruminants, wherein said solid supplement comprises a calcium component comprising calcium lactate and calcium gluconate, wherein said solid supplement comprises 0 to 20 weight percent of sodium chloride, wherein said solid supplement exhibits a water solubility at 25° C. of at least 70 g/L, as measured according to OPPTS 830.7840, wherein said solid supplement has a calcium to phosphorous ratio greater than 2.1:1, wherein said solid supplement has a weight ratio of calcium gluconate to calcium lactate in the range of 0.1:1 to 10:1, wherein said solid supplement comprises less than 10 weight percent of protein;
(b) dissolving said solid supplement in water in an amount of not more than 2.0 g/L to thereby provide a liquid nutritional ruminant supplement having a turbidity of no more than 100 NTU, as measured according to ISO 7027; and
(c) providing said liquid supplement at a location for consumption by one or more ruminants.

22. The method of claim 21, wherein said solid supplement comprises 5 to 80 weight percent of said calcium lactate and 5 to 80 weight percent of said calcium gluconate.

23. The method of claim 21, wherein said solid supplement comprises:
a potassium component;
a copper component;
a vitamin C component; and
a complete vitamin B complex comprising thiamine, riboflavin, niacin, pantothenic acid, pyridoxine hydrochloride, biotin, folic acid, and cyanocobalamin.

* * * * *